(12) United States Patent
Norton, Jr.

(10) Patent No.: US 7,230,782 B2
(45) Date of Patent: Jun. 12, 2007

(54) CORRELATION RECEIVER FOR DEMODULATING SERVO TRACK INFORMATION

(75) Inventor: David Elliott Norton, Jr., Boulder, CO (US)

(73) Assignee: Quantum Corporation, San Jose, CA (US)

( * ) Notice: Subject to any disclaimer, the term of this patent is extended or adjusted under 35 U.S.C. 154(b) by 268 days.

(21) Appl. No.: 10/652,750

(22) Filed: Aug. 28, 2003

(65) Prior Publication Data

US 2005/0046987 A1    Mar. 3, 2005

(51) Int. Cl.
  G11B 5/09  (2006.01)
  G11B 20/10  (2006.01)
  G11B 5/02  (2006.01)
  G11B 15/52  (2006.01)
  G11B 19/02  (2006.01)

(52) U.S. Cl. .................... 360/39; 360/46; 360/55; 369/47.26

(58) Field of Classification Search ............ None
See application file for complete search history.

(56) References Cited

U.S. PATENT DOCUMENTS

| | | | |
|---|---|---|---|
| 4,399,474 A | 8/1983 | Coleman, Jr. | |
| 5,231,544 A | 7/1993 | Matsushige | |
| 5,287,228 A * | 2/1994 | Sawaguchi et al. | 360/57 |
| 5,363,100 A * | 11/1994 | Bailey et al. | 341/132 |
| 5,373,400 A | 12/1994 | Kovacs | |
| 5,388,011 A | 2/1995 | Tollum | |
| 5,508,855 A | 4/1996 | Hutchins et al. | |
| 5,530,601 A | 6/1996 | Hutchins et al. | |
| 5,949,597 A | 9/1999 | Pahr | |
| 6,031,672 A | 2/2000 | Bergquist et al. | |
| 6,081,768 A | 6/2000 | Hu et al. | |
| 6,100,829 A | 8/2000 | Fredrickson et al. | |
| 6,246,535 B1 | 6/2001 | Saliba et al. | |
| 6,469,862 B2 * | 10/2002 | Stein et al. | 360/77.02 |
| 6,499,662 B1 | 12/2002 | Coleman et al. | |
| 6,558,774 B1 * | 5/2003 | Saliba et al. | 428/156 |
| 6,762,712 B2 * | 7/2004 | Kim | 342/135 |

FOREIGN PATENT DOCUMENTS

EP    0 729 148 A    8/1996
JP    1029024 A    1/1989

OTHER PUBLICATIONS

European Search Report completed on Jan. 5, 2005 and mailed on Jan. 13, 2005, for EP patent application No. 04254871.9, filed on Aug. 13, 2004: 5 pages.

* cited by examiner

*Primary Examiner*—William Korzuch
*Assistant Examiner*—Daniell L. Negrón
(74) *Attorney, Agent, or Firm*—Morrison & Foerster LLP

(57) ABSTRACT

A correlation receiver, among other functions, detects peaks of a correlation signal. The correlation receiver includes a master peak detector for determining whether an amplitude of a pulse of the correlation signal exceeds by at least a first delta an amplitude of a prior peak. If so, the master peak detector designates the pulse as a peak and sets an amplitude of the peak as the amplitude of the prior peak increased by a second delta. The master peak detector may also determine whether the amplitude of the correlation signal pulse falls below an amplitude of the prior peak less a droop value; and, if so, the master peak detector does not designate the pulse as a peak.

46 Claims, 4 Drawing Sheets

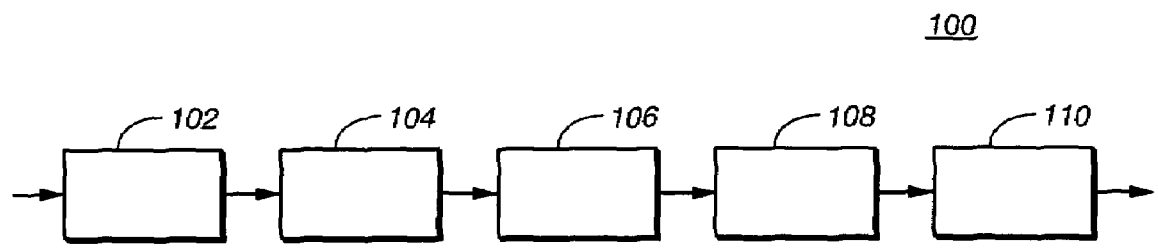
FIG._1
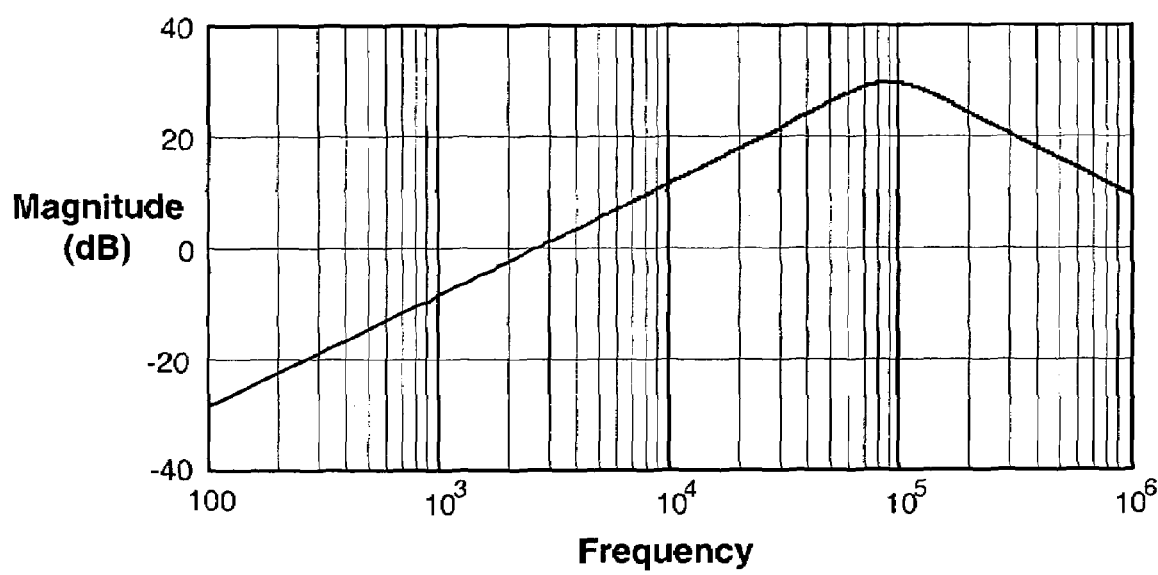
FIG._2

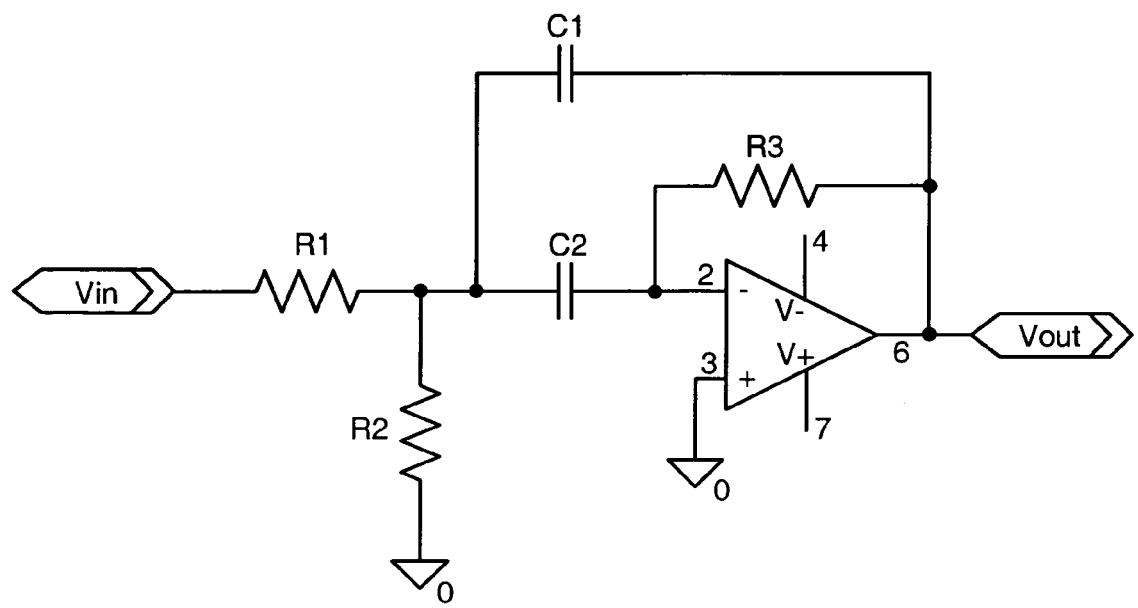
FIG._3
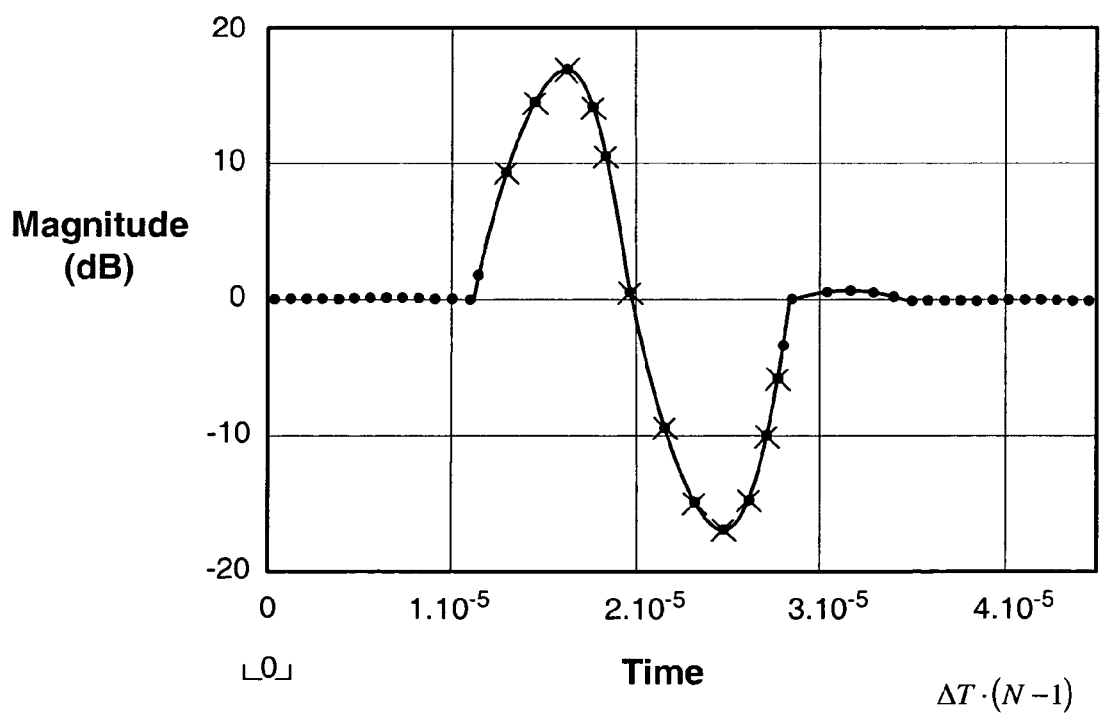
FIG._4

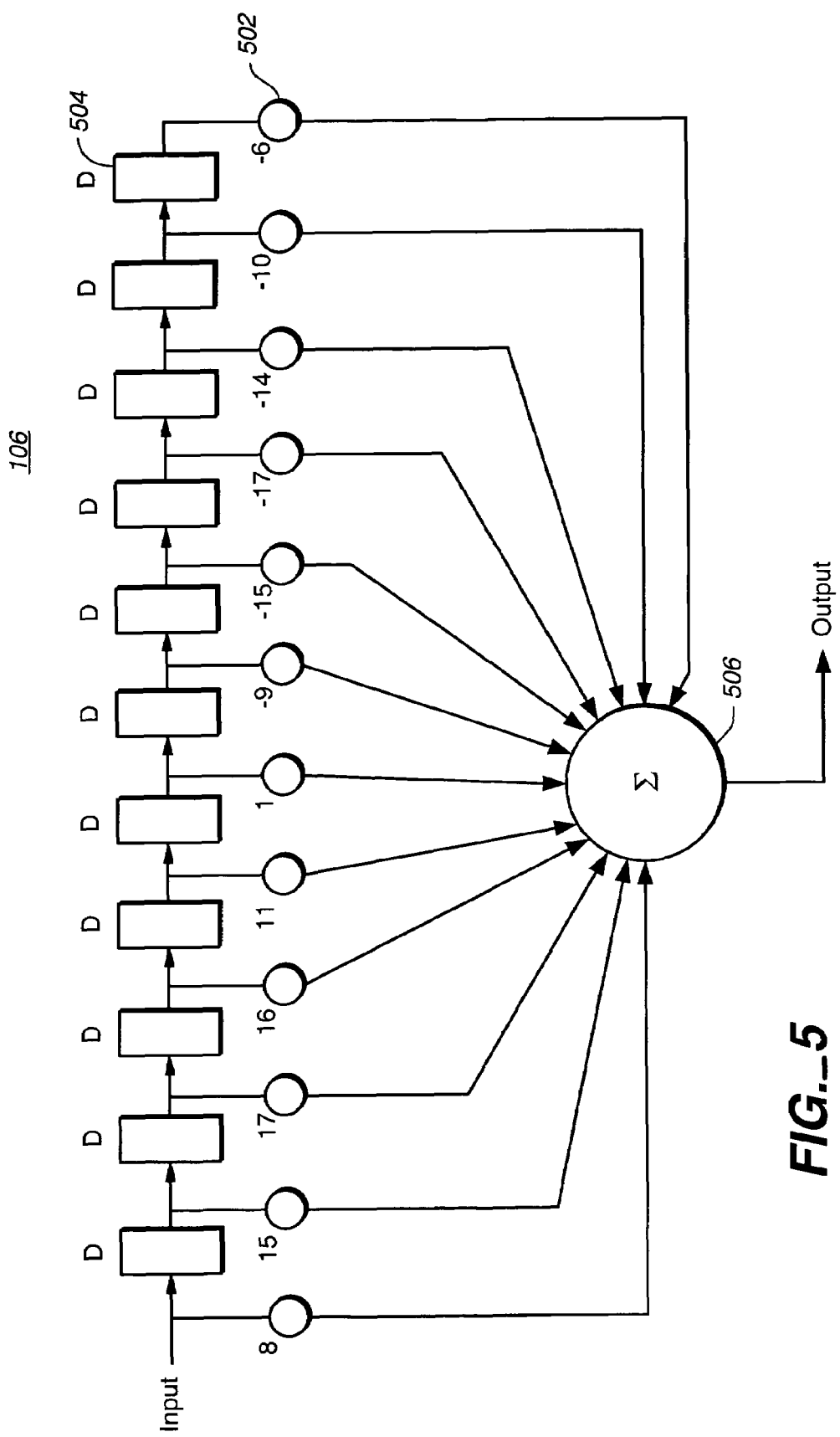
FIG._5

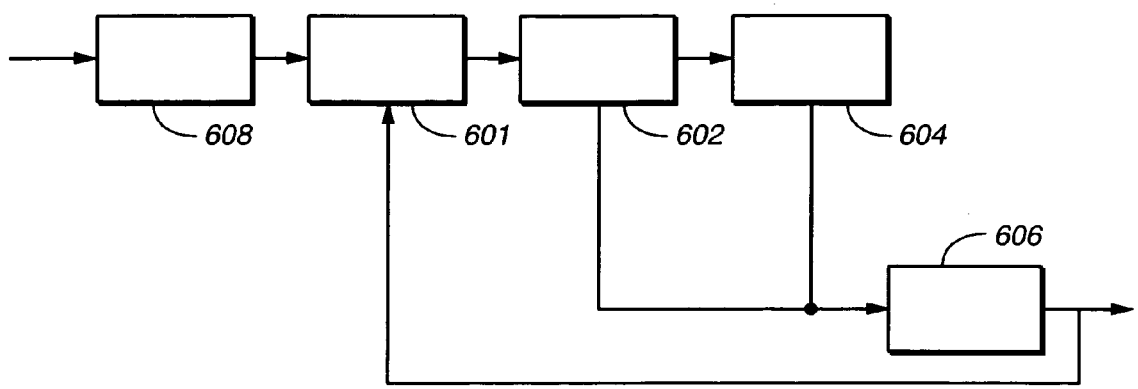
FIG._6
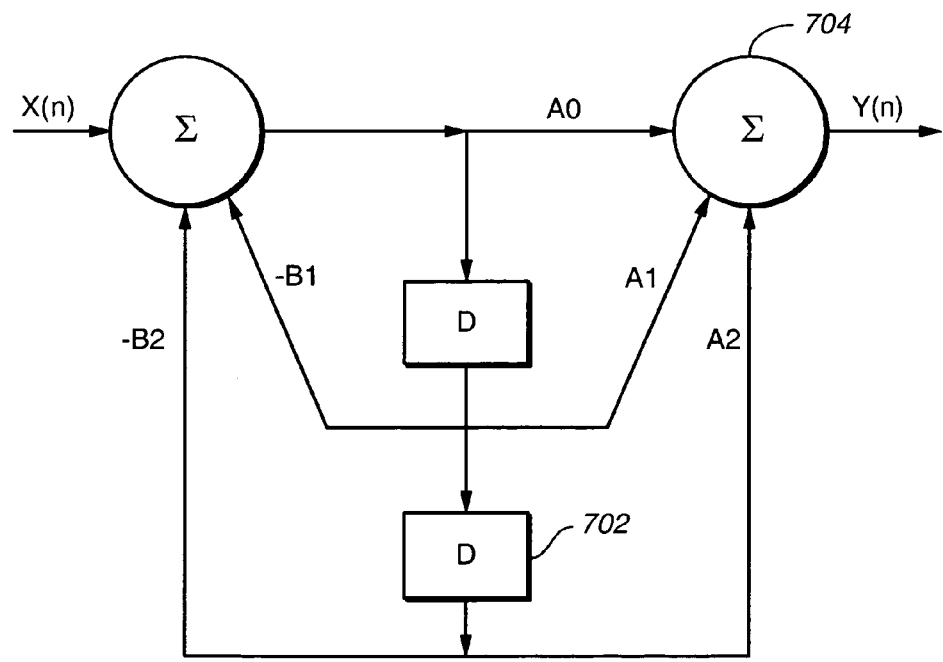
FIG._7

CORRELATION RECEIVER FOR DEMODULATING SERVO TRACK INFORMATION

BACKGROUND OF THE INVENTION

1. Field of the Invention

The present invention relates to tracking movement of a magnetic tape, and more specifically to demodulating servo track information on the tape.

2. Related Art

Mass storage devices and media require increased data storage capacity and retrieval performance. As to linear tape recording, in particular, a popular trend is toward multi-head, multi-channel fixed head structures with narrowed recording gaps and track widths, so that many linear tracks may be achieved on a tape medium of predetermined width.

Because of relatively high linear tape velocity, and because tape substrates continue to be made progressively thinner, guiding tape past a tape head structure along an accurate invariant linear path has become progressively more challenging. One tracking error phenomenon is known as lateral tape motion ("LTM"). An optical servo controller may be employed to track lateral motion of the tape relative to a recording head, as described in U.S. Pat. No. 6,246,535, to Saliba, et al., entitled "Optical Apparatus for Tracking a Magnetic Tape," incorporated by reference herein in its entirety. To this end, the tape may include an optically detectable servo track that can be placed on the non-magnetic side of the tape, for example. An optical pickup head detects laser light reflected from the marks of the servo track. In response, the optical servo controller controls lateral head position to align the recording head with the magnetic track on the tape. By tracking lateral tape motion, this technique allows for narrower track width and thus greater storage density on the tape.

One problem with servo track detection is noise on the signal representing the light reflected from the servo marks. A peak detector is typically employed to detect the peak reflectivity from each mark, to thereby establish the position of the mark. However, noise on the peak can result in misdetection of the peak position. Improvement in the signal to noise ratio of the detected peak could lead to finer detection resolution in the lateral direction, allowing for narrower data track widths and greater storage density on the tape.

SUMMARY OF THE INVENTION

A correlation receiver, among other functions, detects peaks of a correlation signal. The correlation receiver includes a master peak detector for determining whether an amplitude of a pulse of the correlation signal exceeds by at least a first delta an amplitude of a prior peak. If so, the master detector designates the pulse as a peak and sets an amplitude of the peak as the amplitude of the prior peak increased by a second delta. The first delta may equal the second delta in one embodiment. The second delta may be a value of a (e.g., nondecreasing) function of the time between the prior peak and the pulse and/or a value of a (e.g., nondecreasing) function of the prior peak amplitude.

The master peak detector may also determine whether the amplitude of the correlation signal pulse falls below an amplitude of the prior peak less a droop value; and, if so, the master peak detector does not designate the pulse as a peak. The master peak detector may determine whether the amplitude of the correlation signal pulse falls between the prior peak amplitude less the droop value and the prior peak amplitude increased by the first delta. If so, the master peak detector designates the pulse as a peak and sets the amplitude of the peak as the amplitude of the correlation signal pulse. The droop value may be a value of a (e.g., nondecreasing) function of the time between the prior peak and the pulse and/or a (e.g., nondecreasing) function of the prior peak amplitude.

The correlation receiver may also include a bandpass filter, having a transfer function shape, for bandpass filtering an input signal. A correlation filter may correlation filter the bandpass filtered signal, where the correlation filter has a transfer function shape substantially similar to the transfer function shape of the bandpass filter. The correlation signal peaks may correspond to positions of marks on a medium. The bandpass filter may attenuate DC and frequencies above a cutoff frequency, where the cutoff frequency is determined by a low-noise frequency response region of a spectrum representative of each mark. The medium may be magnetic tape, and the marks servo marks that are optically detectable on a surface of the tape opposite a magnetic surface of the tape.

BRIEF DESCRIPTION OF THE DRAWINGS

FIG. 1 illustrates a correlation receiver according to an embodiment of the present invention.

FIG. 2 illustrates a bandpass filter transfer function according to an embodiment of the present invention.

FIG. 3 illustrates a bandpass filter circuit according to an embodiment of the present invention.

FIG. 4 illustrates an output of the bandpass filter of FIG. 3.

FIG. 5 illustrates a correlation filter according to an embodiment of the present invention.

FIG. 6 illustrates a master/slave peak detector according to an embodiment of the present invention.

FIG. 7 illustrates a low pass filter according to an embodiment of the present invention.

DETAILED DESCRIPTION OF EXEMPLARY EMBODIMENTS

FIG. 1 illustrates an embodiment of an correlation receiver 100 of the present invention. The receiver includes an input bandpass/anti-aliasing filter ("BPF") 102, an analog-to-digital converter ("A/D") 104, a correlation filter 106, a master/slave peak detector 108 and a low pass filter ("LPF") 110. In this embodiment the correlation receiver detects laser spots reflected off servo marks on the back coat of magnetic tape. The carrier frequency of the reflected spots is approximately 22 KHz in this example. The carrier frequency is determined by a number of factors, including the pitch at which the servo marks were written and the rate at which the tape is transported past the optical read head. Studies by the inventor have revealed that a significant amount of the noise on the reflected pulse is located at high frequencies (e.g., over 100 KHz) and at DC (the latter due to the difference in reflectivity between the spots and the background reflectivity of the tape). These noise regions were determined empirically for a tape having a servo dot diameter of 12 microns, a servo track pitch of 141 microns, and a tape speed of 116 inches per second. Consequently, the BPF 102 is designed to reject frequencies around the lower-frequency noise region at DC and above the higher-frequency noise region around 100 KHz, in this example. In addition, the BPF 102 acts as an anti-alias filter for the A/D 104, which has a sampling rate of 1 MHz in this example. It was also noted that if the input to the correlation filter is symmetric about DC, then the correlation filter would reject DC. An example of a simple filter topology that meets these requirements is a differentiator with a complex conjugate pole pair to roll off the high frequency response. The BPF 102 transfer function is illustrated in FIG. 2 and an exemplary circuit is illustrated in FIG. 3.

FIG. 4 illustrates an output of the BPF 102 averaged for a large number of input pulses. Because the input reflected spot signal approximates an impulse, the shape of the BPF output is essentially the BPF transfer function itself. This characteristic of the BPF output motivates the choice of the correlation filter 106 of the invention. Instead of correlating to the input reflected spot signal, the correlation filter 106 correlates to the BPF output. Accordingly, the transfer function (i.e., the reference) of the correlation filter 106 may be selected as effectively the same as that of the BPF 102, or, more accurately, as the frequency response of the BPF 102 output averaged for a statistically significant number of input reflected spot signals, as illustrated in FIG. 4. The nearly symmetric correlation filter response summed over the filter period is almost zero. This results in substantial DC rejection, in turn making the filter output nearly independent of ambient light level changes and background reflectivity differences.

FIG. 5 illustrates an embodiment of a correlation filter 106 of the invention. In this example the correlation filter 106 is implemented as a 12-tap finite impulse response ("FIR") cross-correlation filter having tap weights 502, delay elements 504 and adder 506. The tap weights 502 are selected from the average expected BPF output response, as indicated by the "x"s of FIG. 4. The rejection of DC by the BPF 102 prior to the correlation filter 106 allows the ends of the correlation filter function to be zero. Thus, the low amplitude samples at the ends are truncated to simplify the filter without significantly altering the output. Those skilled in the art will recognize that, with appropriate modifications, the correlation receiver may employ a matched filter in place of a correlation filter. Because of the similarities, the application uses the terms "correlation filter" and "matched filter" interchangeably.

A conventional peak detector employs only one sample, making it sensitive to noise around the peak. In this embodiment, the correlation filter 106 employs 12 samples around the peak. Of course, 12 samples provide more information than one sample. The correlation filter 106 provides greater noise immunity because it averages the noise from the multiple samples.

The correlation filter 106 provides an output matching a reference signal; here the average expected BPF output. Each output pulse peak corresponds to a spatial position on the tape, which itself corresponds to a temporal position based on the tape transport speed. A peak, however, may result from noise, and not represent the actual servo mark on the tape. Thus, the present invention uses the master/slave peak detector 108 to qualify the peak in a number of ways to increase the SNR.

Information about the quality of the match of the expected pulse to the reference is located only in the region around the peak. Maintaining only this peak information allows the system to be downsampled to the optical spot rate (e.g., 21–22 KHz). This reduces the number of calculations, and provides some additional bandlimiting of the noise.

FIG. 6 illustrates a master/slave peak detector according to an embodiment of the invention. The detector 108 includes a negative clipper 608, a lockout timer 601, a first master detector 602, a second master detector 604, and a slave 606. The first master 602 qualifies positive-going pulses, and the second master 604 qualifies negative-going pulses. The slave 606 stores the value to be output as the detected peak.

The peak detector 108 sets four conditions to qualify the peaks that are output by the correlation filter 106. The conditions account for the following situations: (1) the current sample is larger than the previous sample; (2) the current sample is smaller than the previous sample; (3) the current sample follows the previous sample by a predetermined amount of time; and (4) a negative correlation.

In general, an increase in peak amplitude is considered to indicate better detection of the actual peak reflected from a servo mark. However, empirical studies of an SDLT 600 tape drive modified to employ the peak detector of the invention demonstrate that the magnitude of the peak may be unduly increased by noise into the demodulator. (The SDLT 600 is manufactured by Quantum Corporation, the assignee of the present invention.) This can be understood by the fact that the input BPF 102 shapes any impulse-like input (including noise) into a signal that the correlation filter 106 may recognize as a peak.

Accordingly, the first master detector 602 may qualify the currently detected correlation pulse to determine whether its amplitude exceeds by at least a first delta threshold value the amplitude of the previous peak. If so, the first master designates the pulse as a peak, but limits the qualified amplitude of the peak to the amplitude of the peak increased by a second delta limit value. The qualified peak amplitude is stored in the slave. In one embodiment, the first and second deltas are equal. In general, the positive-going threshold (and limit) may be a nondecreasing function of the amplitude of the previous peak and the time between the previous peak and the current peak. In particular, the threshold (limit) function may be a linear function of time with a positive (nondecreasing) slope.

Empirical data indicates that, to sufficiently limit the noise on the peak in the representative tape drive, the first and second deltas may be set to the same value to reach approximately 20% (or more precisely 17.8% rounded up to 20%) at the time of the next expected peak. The next expected peak time is known a priori because the tape speed and the distance between servo marks on the tape is known. In particular where the threshold (limit) function is a linear function of time, this delta value is related to the slew rate of the peak detector, which itself is set to relate to the maximum lateral speed of the optical head in the servo controller. As a rule of thumb, the delta value here was picked to allow the output of the peak detector to slew at approximately twice the rated maximum speed of the optical head (since the head speed can sometimes exceed the rated maximum speed). That is, if the amplitude of the current pulse exceeds that of the previous pulse by 20%, then the current pulse is qualified as a peak, and clipped to the value of the previous pulse amplitude increased by 20%. Note that, assuming a linear threshold (limit) function with a positive (nondecreasing) slope, if the next detected pulse actually occurs later than expected, the delta limit value would be higher.

The second master detector 604 handles a correlation pulse that falls below the previous peak. If the pulse falls below the prior peak by a predetermined droop value, then the second master does not designate the pulse as a peak. In one embodiment, the droop threshold function may be a nondecreasing function of the time between the prior peak and current correlation pulse. For example, the droop function may have a linear droop (slew) rate (with a positive slope, which becomes negative when subtracted from the prior peak value) that causes the lower threshold (prior peak value less the droop function) to decrease as a function of time.

In another embodiment, the droop rate also may vary as a function of the amplitude of the prior peak. Because a large prior peak more likely indicates a true peak, whereas a small prior peak does not, a larger droop rate may be assigned to the larger prior peak amplitudes than the smaller prior peak amplitudes. For example, four droop rates may be assigned as follows:

| Peak amplitude (bits) | Droop rate (bits per clock) |
|---|---|
| 128–255 | 1 |
| 64–127 | 0.5 |
| 32–63 | 0.25 |
| 0–32 | 0.125 |

The peak amplitude is expressed in terms of the input dynamic range of the peak detector. In this example, the sample rate is 1 MHz with a 22 KHz pulse rate, and a maximum peak amplitude measured as 255. Under these conditions, 22 KHz is 1/45.45 of 1 MHz, implying that a droop rate of one bit per 1 MHz clock will cause a 45.45 bit droop after 45.45 samples (the next expected peak time), which results in a droop value of 17.8% of 255. This approximates the 20% value discussed above for the next expected detected pulse. Note that if a pulse is not detected at the expected time, the lower threshold continues to decline at the droop rate, to make it more likely to detect a peak over time.

If the amplitude of the correlation signal pulse falls between the prior peak amplitude less the droop value and the prior peak amplitude increased by the first delta, then the amplitude of the detected peak output from the master/slave detector 108 is set to the amplitude of the correlation signal pulse. This value is stored in the slave 606, and, in the latter case, is simply output by the detector 108 as the value from the slave without modification.

The positive qualification implemented by the first master detector reduces noise in subsequent pulses over time. For example, a large noise spike will cause the detection threshold for subsequent pulses to be increased substantially (because the lower (detection) threshold of the second master detector is based on the previous peak). The lower threshold decreases as a function of the droop rate. Nevertheless, multiple actual servo mark reflections may be missed before the lower threshold has become low enough to start detecting those pulses. By limiting the maximum peak increase (through the second delta limit), the correlation receiver reduces the number of pulses that may be missed due to a noise spike that would otherwise set a higher peak value from which the negative-going threshold function would start.

The detector 108 also may employ lockout timer 601. The lockout timer 601 starts clocking when the detector 108 detects a peak, and locks out (i.e., disallows) subsequent pulses to be detected as peaks until the passage of a predetermined time interval. For example, the timer may be set to lock out correlation pulses until 85% of the expected time until the next peak has passed. The expected time is based on, for example, prior knowledge that the servo marks are periodic with a known periodicity, and separated by predetermined, uniform distances. The lockout timer 601 improves sampling when the input signal is small by ignoring pulses unlikely to represent true peaks. Also, the lockout timer is reset to a new starting point each time a peak is detected, thereby accounting for jitter.

Only the positive peaks of the correlation signal represent the best match. Accordingly, as a fourth qualification, the clipper 608 clips to zero the negative portions of the input correlation signal.

The frequency response of the master/slave peak detector 108 is effectively that of a zero-order hold with notches at the sampling rate, e.g., 21 KHz. The LPF 110 suppresses the higher order lobes of the response, smoothing the output and suppressing noise spikes that make their way through the detector 108. In one embodiment, the LPF 110 employs an infinite impulse response ("IIR") filter, as shown in FIG. 7. The LPF 110 has delays 702 and adders 704.

The resulting transfer function has the following form:

$$\frac{Y(s)}{X(s)} = \frac{as + b}{s^2 + \frac{\omega r}{Q}s + \omega r^2}$$

which is a transfer function for a complex conjugate pole pair with a zero, where s is frequency, ωr is resonant frequency, a and b are constants, and the phase lead may be adjusted by adjusting Q, the selectivity.

This is a simple topology that introduces a short transport delay into the tracking control loop. The LPF 110 sample rate may be the same as that of the detector 108. Because the return lobes of the LPF 110 occur at the same position as the notches of the zero-order hold, the notches suppress the return lobes.

The output of the correlation receiver 100 is provided to an optical servo controller such as that described above to provide position information for a servo mark. For servo controllers that detect three marks at a time, the functionality described herein would be repeated to provide one output for each mark.

Although the invention has been described in conjunction with particular embodiments, it will be appreciated that various modifications and alterations may be made by those skilled in the art without departing from the spirit and scope of the invention. The invention is not to be limited by the foregoing illustrative details, but rather interpreted according to the scope of the claims.

What is claimed is:

1. A method for detecting peaks of a correlation signal, the method comprising:
   determining whether an amplitude of a pulse of the correlation signal exceeds by at least a first delta value an amplitude of a prior peak; and
   if so, setting an amplitude of a new peak as the amplitude of the prior peak increased by a second delta value, wherein the second delta value is a value of an increasing function of the time between the prior peak and the pulse.

2. The method of claim 1, wherein the first delta value equals the second delta value.

3. The method of claim 1, wherein the second delta value is a value of a nondecreasing function of the prior peak amplitude.

4. The method of claim 1, wherein the second delta value is a value of a function of the prior peak amplitude and the time between the prior peak and the pulse.

5. The method of claim 2, wherein the second delta value is a value of a function of the prior peak amplitude and the time between the prior peak and the pulse.

6. The method of claim 1, further comprising:
determining whether the amplitude of the correlation signal pulse falls below an amplitude of the prior peak less a droop value; and
if so, not designating the pulse as a peak.

7. The method of claim 6, further comprising:
if the amplitude of the correlation signal pulse falls between the prior peak amplitude less the droop value and the prior peak amplitude increased by the first delta value, setting the amplitude of the peak as the amplitude of the correlation signal pulse.

8. The method of claim 6, wherein the droop value is a value of a nondecreasing function of the time between the prior peak and the pulse.

9. The method of claim 6, wherein the droop value is a value of a nondecreasing function of the prior peak amplitude.

10. The method of claim 6, wherein the droop value is a value of a function of the prior peak amplitude and the time between the prior peak and the pulse.

11. The method of claim 1, further comprising:
bandpass filtering an input signal with a bandpass filter having a transfer function; and
correlation filtering the bandpass filtered signal with a correlation filter having a transfer function based upon the transfer function of the bandpass filter.

12. The method of claim 11, the correlation signal peaks corresponding to positions of marks on a medium, wherein the bandpass filtering attenuates DC and frequencies above a cutoff frequency, the cutoff frequency determined by a low-noise frequency response region of a spectrum representative of each mark.

13. The method of claim 12, wherein the medium is magnetic tape.

14. The method of claim 13, wherein the marks are servo marks on the tape.

15. The method of claim 14, wherein the servo marks are optically detectable.

16. The method of claim 15, wherein the servo marks are optically detectable on a surface of the tape opposite a magnetic surface of the tape.

17. A correlation receiver for detecting peaks of a correlation signal, the correlation receiver comprising:
a master peak detector for determining whether an amplitude of a pulse of the correlation signal exceeds by at least a first delta value an amplitude of a prior peak; and, if so, setting an amplitude of a new peak as the amplitude of the prior peak increased by a second delta value, wherein the second delta value is a value of an increasing function of the time between the prior peak and the pulse.

18. The correlation receiver of claim 17, wherein the first delta value equals the second delta value.

19. The correlation receiver of claim 17, wherein the second delta value is a value of a nondecreasing function of the prior peak amplitude.

20. The correlation receiver of claim 17, wherein the second delta value is a value of a function of the prior peak amplitude and the time between the prior peak and the pulse.

21. The correlation receiver of claim 18, wherein the second delta value is a value of a function of the prior peak amplitude and the time between the prior peak and the pulse.

22. The correlation receiver of claim 17, wherein the master peak detector is operable to determine whether the amplitude of the correlation signal pulse falls below an amplitude of the prior peak less a droop value, and, if so, not designate the pulse as a peak.

23. The correlation receiver of claim 22, wherein the master peak detector is operable to determine whether the amplitude of the correlation signal pulse falls between the prior peak amplitude less the droop value and the prior peak amplitude increased by the first delta value, and, if so, set the amplitude of the new peak as the amplitude of the correlation signal pulse.

24. The correlation receiver of claim 22, wherein the droop value is a value of a nondecreasing function of the time between the prior peak and the pulse.

25. The correlation receiver of claim 22, wherein the droop value is a value of a nondecreasing function of the prior peak amplitude.

26. The correlation receiver of claim 22, wherein the droop value is a value of a function of the prior peak amplitude and the time between the prior peak and the pulse.

27. The correlation receiver of claim 17, further comprising:
a bandpass filter, having a transfer function, for bandpass filtering an input signal; and
a correlation filter for correlation filtering the bandpass filtered signal, the correlation filter having a transfer function based upon the transfer function of the bandpass filter.

28. The correlation receiver of claim 27, the correlation signal peaks corresponding to positions of marks on a medium, wherein the bandpass filter attenuates DC and frequencies above a cutoff frequency, the cutoff frequency determined by a low-noise frequency response region of a spectrum representative of each mark.

29. The correlation receiver of claim 28, wherein the medium is magnetic tape.

30. The correlation receiver of claim 29, wherein the marks are servo marks on the tape.

31. The correlation receiver of claim 30, wherein the servo marks are optically detectable.

32. The correlation receiver of claim 31, wherein the servo marks are optically detectable on a surface of the tape opposite a magnetic surface of the tape.

33. A method for detecting a pulse input signal comprising:
bandpass filtering the input signal with a bandpass filter having a transfer function;
correlation filtering the bandpass filtered signal with a correlation filter having a transfer function based upon the transfer function of the bandpass filter; and
detecting peaks of the correlation-filtered signal.

34. The method of claim 33, the correlation-filtered signal peaks corresponding to positions of marks on a medium, wherein the bandpass filtering attenuates frequencies above a cutoff frequency, the cutoff frequency determined by a low-noise frequency response region of a spectrum representative of each mark.

35. The method of claim 34, wherein the medium is magnetic tape.

36. The method of claim 35, wherein the marks are servo marks on the tape.

37. The method of claim 36, wherein the servo marks are optically detectable.

38. The method of claim 37, wherein the servo marks are optically detectable on a surface of the tape opposite a magnetic surface of the tape.

39. A correlation receiver for detecting a pulse input signal comprising:
- a bandpass filter, having a transfer function, for bandpass filtering the input signal;
- a correlation filter for correlation filtering the bandpass filtered signal, the correlation filter having a transfer function based upon the transfer function of the bandpass filter; and
- a detector for detecting peaks of the correlation-filtered signal.

40. The correlation receiver of claim 39, the correlation-filtered signal peaks corresponding to positions of marks on a medium, wherein the bandpass filter attenuates frequencies above a cutoff frequency, the cutoff frequency determined by a low-noise frequency response region of a spectrum representative of each mark.

41. The correlation receiver of claim 40, wherein the medium is magnetic tape.

42. The correlation receiver of claim 41, wherein the marks are servo marks on the tape.

43. The correlation receiver of claim 42, wherein the servo marks are optically detectable.

44. The correlation receiver of claim 43, wherein the servo marks are optically detectable on a surface of the tape opposite a magnetic surface of the tape.

45. The method of claim 33, wherein detecting peaks comprises:
- determining whether an amplitude of a pulse of the correlation-filtered signal exceeds by at least a first delta value an amplitude of a prior peak; and, if so, setting an amplitude of a new peak as the amplitude of the prior peak increased by a second delta value.

46. The correlation receiver of claim 39, further comprising: a master peak detector for determining whether an amplitude of a pulse of the correlation-filtered signal exceeds by at least a first delta value an amplitude of a prior peak, and, if so, setting an amplitude of a new peak as the amplitude of the prior peak increased by a second delta value.

* * * * *